(12) United States Patent
Foster et al.

(10) Patent No.: US 7,028,095 B1
(45) Date of Patent: Apr. 11, 2006

(54) BLOCK-BASED NEGATIVE FILTERING OF MPEG-2 COMPLIANT TABLE SECTIONS

(75) Inventors: Eric M. Foster, Owego, NY (US); Bryan J. Lloyd, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 09/534,901

(22) Filed: Mar. 23, 2000

(51) Int. Cl.
*G06F 15/16* (2006.01)

(52) U.S. Cl. ............... 709/231; 709/226; 709/229; 709/247; 370/349; 707/513

(58) Field of Classification Search ............... 709/231, 709/226, 229, 247; 370/349
See application file for complete search history.

(56) References Cited

U.S. PATENT DOCUMENTS

| | | | |
|---|---|---|---|
| 5,032,525 A | 7/1991 | Lee et al. | |
| 5,537,099 A | 7/1996 | Liang | |
| 5,680,457 A | 10/1997 | Bestler et al. | |
| 5,793,410 A | 8/1998 | Rao | |
| 5,805,808 A | 9/1998 | Hasani et al. | |
| 5,835,591 A | 11/1998 | Cochon et al. | |
| 5,883,924 A | 3/1999 | Siu et al. | |
| 5,898,695 A | 4/1999 | Fujii et al. | |
| 5,940,738 A | 8/1999 | Rao | |
| 6,026,506 A | 2/2000 | Anderson et al. | |
| 6,459,427 B1* | 10/2002 | Mao et al. | 345/327 |
| 6,477,185 B1* | 11/2002 | Komi et al. | 370/536 |
| 2002/0024967 A1* | 2/2002 | Zaun et al. | 370/249 |
| 2002/0131443 A1* | 9/2002 | Robinett et al. | 370/422 |

* cited by examiner

*Primary Examiner*—Jason Cardone
*Assistant Examiner*—Adnan M. Mirza
(74) *Attorney, Agent, or Firm*—Whitham, Curtis & Christofferson, P.C.

(57) ABSTRACT

Positive negative and mixed digital filtering over an arbitrary variable length bit string of a datastream by evaluating bits, bytes or any other desired granularity in accordance with a mask, a filter and a not match byte. Results are accumulated over a plurality of data blocks by ANDing of compare result values similarly representing match and not match results identically depending on the not match bit except where negayive logic has been applied over an entire data block. The preferred form of the digital filter is particularly adapted to be MPEG-2 compliant.

14 Claims, 4 Drawing Sheets

BLOCK-BASED NEGATIVE FILTERING OF MPEG-2 COMPLIANT TABLE SECTIONS

BACKGROUND OF THE INVENTION

1. Field of the Invention

The present invention generally relates to the transmission and storage of digital video information and, more particularly, to positive, negative and mixed filtering of MPEG-2 compliant table sections for storage.

2. Description of the Prior Art

Since its invention, television has been recognized to have great economic and social potential. At the present time, when wide bandwidth transmission systems such as coaxial cable systems are becoming relatively ubiquitous, much of the economic and social potential derives from the variety of programming or other information which can be provided to users and the willingness of users to pay for access to particular information, such as pay-per-view movies at a time convenient to them.

While coaxial cable distribution systems provide very substantial numbers of choices of information available as well as some capacity for so-called upstream signalling and even Internet communications of increased speed relative to telephone/modem arrangements, there is increased demand for wider variety and flexibility of programming which can only be provided, at the present state of the art, through digital communications using extremely broad band transmission media such as microwave, satellite and fiber optic links.

Even with these broad band communication media, the required capacity, the volume and variety of data contained in common programming requires extreme compression to support the number of separate communications which may be required to be transmitted over a communication link of finite although substantial capacity. Accordingly, a compression convention referred to as MPEG (Motion Picture Experts Group has been promulgated in several versions (e.g. MPEG-2) and has become an industry standard. This standard is extremely flexible and adaptive to transmission content to allow extreme compression.

In order to implement this compression convention, a so-called "set-top box" (STB) has been developed (referred to as a target decoder under the MPEG standard) and, at the present time, has a well-established architecture. The processing of which the STB is capable is, of course, very substantial since MPEG compression is very complex. While little storage is generally required (or, in many cases, even possible due to substantially real-time processing constraints) for decoding within the MPEG decoder architecture, public familiarity with the functions of video cassette recorders (VCRs) has led to a demand for substantial amounts of storage to support similar functions in the STB. Decompression is generally performed in several stages and allows convenient storage in a coded form which is substantially compressed relative to the final displayable format.

Storage capacity and memory access rate remain critical factors in STB design in view of the massive number of bytes which are transmitted to simultaneously communicate a large number of separate programs. This, of course, implies that each program will be represented by a relatively small fraction of the total amount of transmitted data even though the amount of data in that program remains large enough to require storage and most signal processing to be performed on data in compressed form. Therefore, filtering of data is necessary to limit the amount of data stored to that which is needed for support of desired functions of the STB.

For example, to extract data relevant to a single program, positive filtering is performed to match a stored table identification (TID) value against certain fields in each MPEG-2 compliant packet header so that packets which have a TID value which is mismatched to the program(s) currently being received can be discarded.

Not only is it necessary to filter data on the packet level before sending data to memory but it is also necessary to filter on the table section layer of the MPEG-2 compliant signal to prevent the memory from being filled with data and memory access time being consumed by storage of data which must eventually be parsed and discarded. An example of data which would be later discarded after being parsed would be data containing errors since the transmission medium may be "lossy" and errors in received data may commonly occur. Another example might be where more than one program was sent over a single channel and only one program was of interest.

More importantly, under the MPEG-2 convention, tables are used for non-audio/video data such as program schedule and navigation data or supplemental data such as sports statistics or subtitle data which may be displayed at the will of the user or even control data to control reception for limited access (e.g. pay-per-view) programming. In general more table data than is necessary is transmitted to be certain it is available when needed by the STB.

Due to substantially real-time processing demands, filters are generally implemented in hardware as an array of gates and registers for each filter. At a relatively high level of abstraction, a filter can be considered as registers respectively containing a filter value containing bit values against which data is to be compared, a mask value containing the bits to indicate the bits of interest and the data being filtered. The filter, mask and data registers are generally arranged as a block of limited length for hardware efficiency; containing four bytes which are set up by the signal application processor.

Outputs of these registers are applied to the inputs of gates and the outputs of the gates logically combined to either pass the data for storage or to discard it by blocking transfer for storage. Appropriate logic functions to be applied between the outputs of the registers to implement the filter functions are familiar and well-understood by those skilled in the art. Further, as disclosed in U.S. patent application Ser. No. 08/939,019, filed Sep. 26, 1997, assigned to the assignee of the present application and hereby fully incorporated by reference, filtering may be done in a plurality of stages with the result of one filtering process pointing to the next filtering process and/or data fields to be filtered in a linked list to be performed and thus effectively provides variable filtering length.

The most commonly filtered field within the section table layer syntax of MPEG-2 compliant data is the eight bit Table ID field since the table ID field is the most basic identifier for table sections and a hardware filter may be configured to send to memory all table sections having a particular PID value that also have a table ID field matching or partially matching a defined value. This is also an example of positive filtering where a match of one or more bits must be found for the data to be passed for storage. Such positive filtering with an effectively variable filter length provided by the above-incorporated application meets not only the applications program interface (API) definition of common middleware (e.g. between a low level operating system and an application program) implementations but extends the API to allow many programmable variations such as variable length filtering which can be critical for future applications such as internet protocol (IP) packet transmissions.

The MPEG-2 standard also provides for periodic transmission of information to support additional functions of the STB such as programming information to allow the user to navigate through available lists of programs. Such information is generally stored unconditionally to be available when needed consistent with a reduced repetition rate. However, it can be appreciated that many of these transmissions will be redundant and of substantial length and yet generally required shortly after the STB may be activated to begin reception. Therefore, such information may require transmission on a relatively frequent basis to be available when needed. It can also be appreciated that avoidance of storage except when such information was changed would require negative filtering (e.g. to suppress storage of information which is identical to that already stored) over long runs of digital data.

Unfortunately, while the filtering arrangement of the above-incorporated application would accommodate long runs of data, it is directed to only positive filtering. Prior to the present invention, no alternative exists for negative filtering of long runs of data other than registers and gate arrays sufficiently extensive to accommodate the maximum data bit string to be compared. Such an approach would require extensive hardware or present a substantial processing burden if implemented in software; neither of which is economically acceptable in a STB, particularly where a large plurality of filters must be implemented in separate hardware (to reduce overall set-up time) as is generally desirable in STBs. The absence of such filtering action results in the storage of data which must be later processed/parsed and discarded. Since no alternative exists, however, unconditional storage of such data increases required storage capacity in the STB and imposes a processing burden that cannot be avoided.

SUMMARY OF THE INVENTION

It is therefore an object of the present invention to provide an extension of the variable length filtering function of the above-incorporated application to negative filtering and mixed positive and negative filtering with variable length and an efficient and acceptably cost-effective amount of hardware.

It is another object of the present invention to allow avoidance of storage of data which is unnecessary to support desired functions of the STB and the subsequent processing necessary to discard It is a further object of the present invention to reduce STB storage and processing requirements to reduce STB costs and/or improve performance of the STB.

It is yet another object of the invention to provide a more rapidly executed filtering process for detecting changes in extended bit strings.

In order to accomplish these and other objects of the invention, a method of filtering a datastream is provided comprising steps of filtering a portion of the datastream in accordance with a logic state of a not match bit and a filter ID to provide a compare result, and combining compare result values in accordance with logic values of not match bits in a not match indication register corresponding to the portion of the datastream, whereby an arbitrary length of the datastream is filtered by an arbitrary filter function of arbitrary length. The method preferably includes implementation of the filter ID with at least a pointer to a next filter function included in a control word. The not match criterion specified by logic values in a not match indication register allows accumulation of a matchword over respective blocks of data by ANDing or ORing bits of a current matchword and a previous matchword based on positive, negative or mixed filtering applied to each block of data in the datastream.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
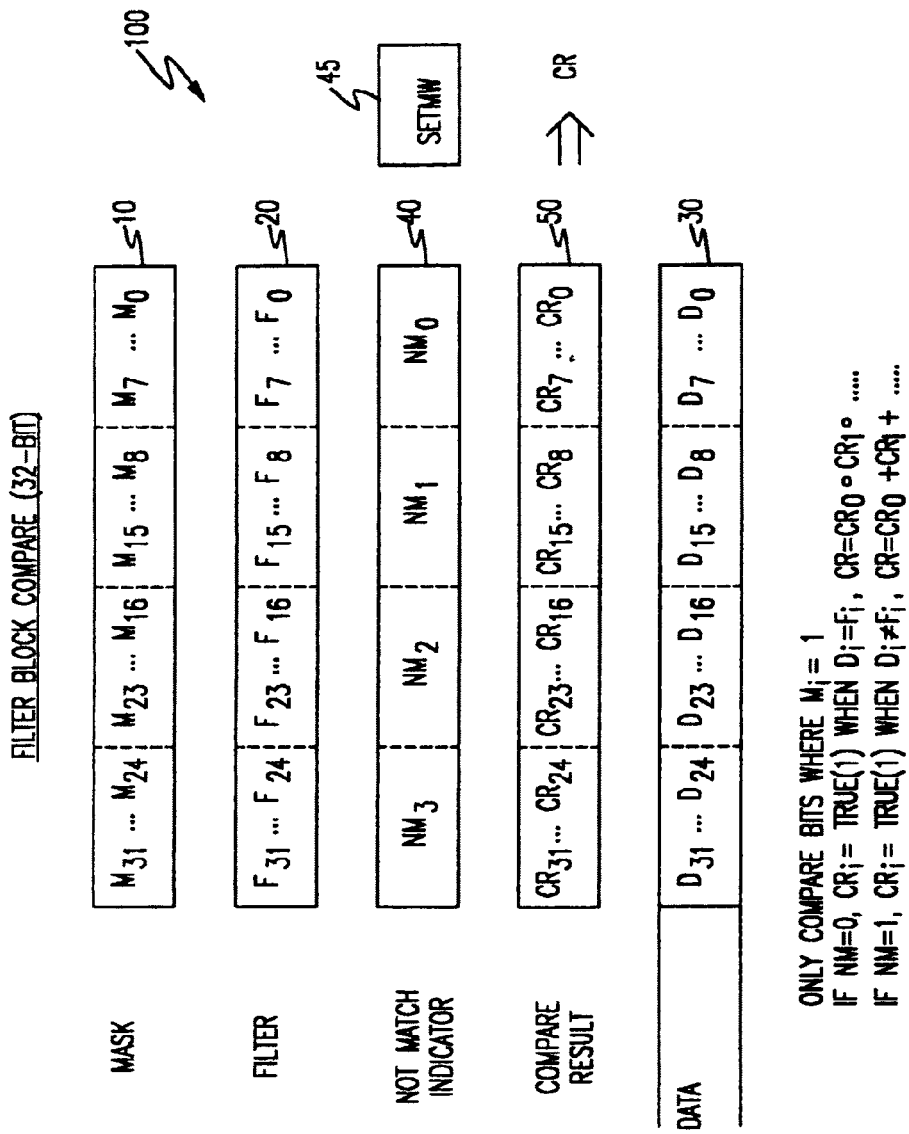
FIG. 1 illustrates register organization in accordance with a preferred form of the invention.

Referring now to the drawings, and more particularly to FIG. 1, there is shown a schematic depiction of registers and data in accordance with a preferred form of the invention. It should be appreciated at the outset that positive and negative filters are individually known and several approaches to variable length filters are also known but not well-suited to a STB environment. The performance of a plurality of different filter functions in sequence on a number of data bits of fixed length and repeating the process on a subsequent group of bits of fixed length (and in accordance with the MPEG-2 standard) in order to achieve effective variable length positive filtering is disclosed in the above-incorporated U.S. Patent application.

However, certain types of data transmitted under the MPEG-2 standard make negative variable length filtering desirable but such filtering has not heretofore been possible with reasonably hardware efficient and economically acceptable filter designs, particularly where multiple comparison functions as performed on the same data at high speed in different programmable hardware filters. Further, different filtering functions including mixed positive and negative filtering may be critical to future and/or user-defined function of a STB. Therefore, the present invention, as will be described below, is directed to a hardware efficient filter having full flexibility of filter function to provide mixed positive and negative filtering at any desired granularity of mixing.

Referring now to FIG. 1, mask register 10, filter register 20 and data register 30 are shown included in filter block 100 (corresponding to a particular filter ID, as will be explained below). As alluded to above, these registers or similar data paths are common to all digital filters. The mask register 10 holds an array of binary bits which indicate whether or not a corresponding bit of data is of interest. For purposes of this discussion, a logical "1" indicates filtering is to be done on a corresponding bit of the data stream and a logical "0" indicates a "don't care" for purposes of the filtering operation. Generally, the gate array is designed so that a bit of interest, as indicated by a "1" in the mask register, enables logic to perform a comparison of each bit of a group of data in register 30 with a corresponding bit of filter register 20 and a "don't care" condition, indicated by a "0" in the mask register forces an output appropriate to that implied and required to avoid affecting the result of other bit comparisons.

For example for a positive filter, the matched bytes are ANDed and a "1" is required/implied for a "don't care" bit to avoid affecting the result. Conversely, for a negative filter, the results of the bit comparison are ORed and a "0" is required/implied for a "don't care" bit to avoid affecting the result.

The filter register 20 contains a template forming the filter data pattern to be applied to the data. If the mask register contains a "1" for a particular bit, corresponding bits of the filter register 20 and the data register 30 are logically combined to provide a true or "1" output if the respective bits match (for positive filtering) or are mismatched (for negative filtering).

For convenience and compliance with the MPEG-2 standard as well as hardware economy and correspondence with the unique filtering arrangement of the above-incorporated application, the mask and filter registers are preferably divided into four eight-bit bytes on a total length of thirty-two bits. Blocks of other sizes could also be provided if desired. The data register 30 is depicted as longer since the data of a table header (or packet) is generally much longer but a corresponding thirty-two bits are the only bits of interest at any given time. Therefore, the data register could be considered as thirty-two bits long, as well.

The invention also provides a further not match indicator register 40 in a manner which is linkable to other filters and blocks and which is preferably four bits long to correspond to the four bytes of the mask, filter and data registers. The respective bits of the not match indicator register control whether positive or negative filtering is to be applied to the respective byte of data. Under the MPEG-2 standard, no greater granularity of mixing of positive and negative filtering is anticipated but a bit of the not match indicator could be provided for each bit or arbitrary group of bits of the mask, filter and data registers if desired. Thus, for example, if a not match bit NMn is "0", positive filtering will be applied to the corresponding byte n (or bit or group of bits) and if the not match bit is "1", negative filtering will be applied.

Also indicated in filter block 100 of FIG. 1 is a block labelled "compare result" 50, depicted in the nature of a register. It should be understood that this illustration represents a conceptual construct for clarity of explanation and will correspond to some structure in the filter such as the output of each set of logic gates used in the bit comparison or the inputs of a logic gate that outputs the overall compare result CR of the filter. (This construct could, in fact, be embodied in a register but use of a register would be very unlikely since the respective bit signals are immediately evaluated and would propagate through a gate provided for that purpose faster than they could written into and read from such a register.)

Thus, if NMn=0,
CRi is true ("1") when Di=Fi and
$CR=CR_0 * CR_1 * CR_2 \ldots$
and if MNn=1,
CRi is true ("1") when Di does not equal Fi and
$CR=CR_0 + CR_1 + CR_2 \ldots$ Note that only one CR value (a "1" or "0") eventually results for each (four byte) block of data even though either positive, negative or mixed positive and negative filtering can be applied to the respective bytes (or potentially bits or groups of bits) therein.

Figure 2:
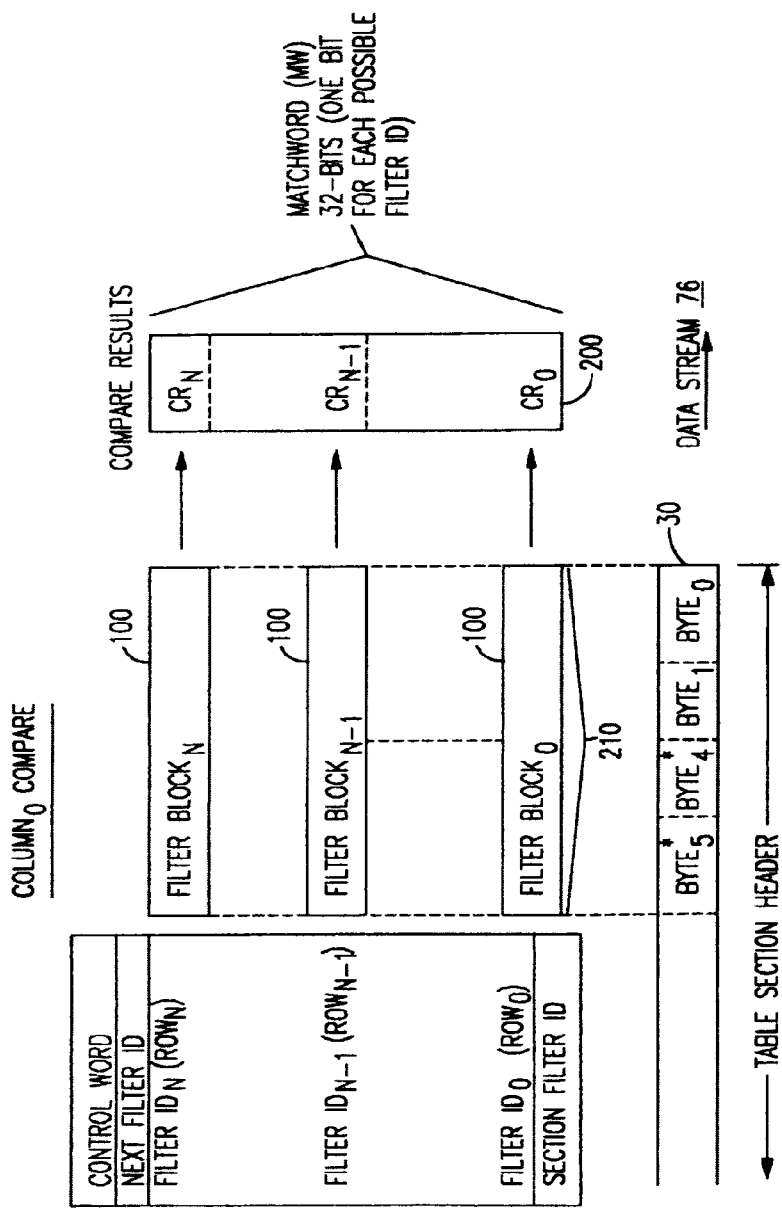
FIG. 2 illustrates performance of a plurality of comparison/filtering functions on a first data block of a table section header in accordance with the invention.

Referring now to FIG. 2, operation of the invention on a first data block extracted from a table header will be explained. It should be noted that a plurality of filter blocks 100 are depicted; each corresponding to the single filter block 100 depicted in FIG. 1. In practice, these filters are applied substantially concurrently, in rapid sequence to the same block (preferably four bytes) of data and then applied again to the next (or another) like block of data from the data stream. The rapid sequence of application allows the set-up of the respective filter blocks to be altered for each block of data filtered.

Multiple filter functions are generally required to accommodate the MPEG-2 standard in which the large data stream is being examined for various types of data needed to support current STB functions. However, it should also be understood that multiple filter blocks are substantially irrelevant to the provision of variable length filtering but, nevertheless, should be considered as a complication of doing so imposed by at least the MPEG-2 standard or other environment in which the invention may be applied.

More specifically, the first block extracted from the table header includes byte 0, byte 1, byte 4 and byte 5 since, under the MPEG standard byte 2 and byte 3 are a length indicator and need not be evaluated. Each filter block 100 then may make a comparison of the data with its own filter algorithm (e.g. as defined by signals in filter register 20, mask register 10 and not match register 40).

An arbitrary number N of such filter blocks (sixty-four being preferred) may be provided by thirty-two separate filter IDs is a preferred configuration. (Again, in theory, a single filter block could be used and set up for each comparison but such an arrangement is not suitable due to the time required to set up the filter; during which time it cannot perform a comparison.) Not all of the thirty-two filter IDs need be used (e.g. N<32). Nevertheless, sixty-four filter blocks and thirty-two filter IDs is sufficient for known and foreseeable needs under MPEG-2 and provides a sufficient number of filter blocks to allow set up of each filter for further bytes in accordance with the filter ID between applications to respective data blocks while other filter blocks are performing comparisons.

Figure 4:
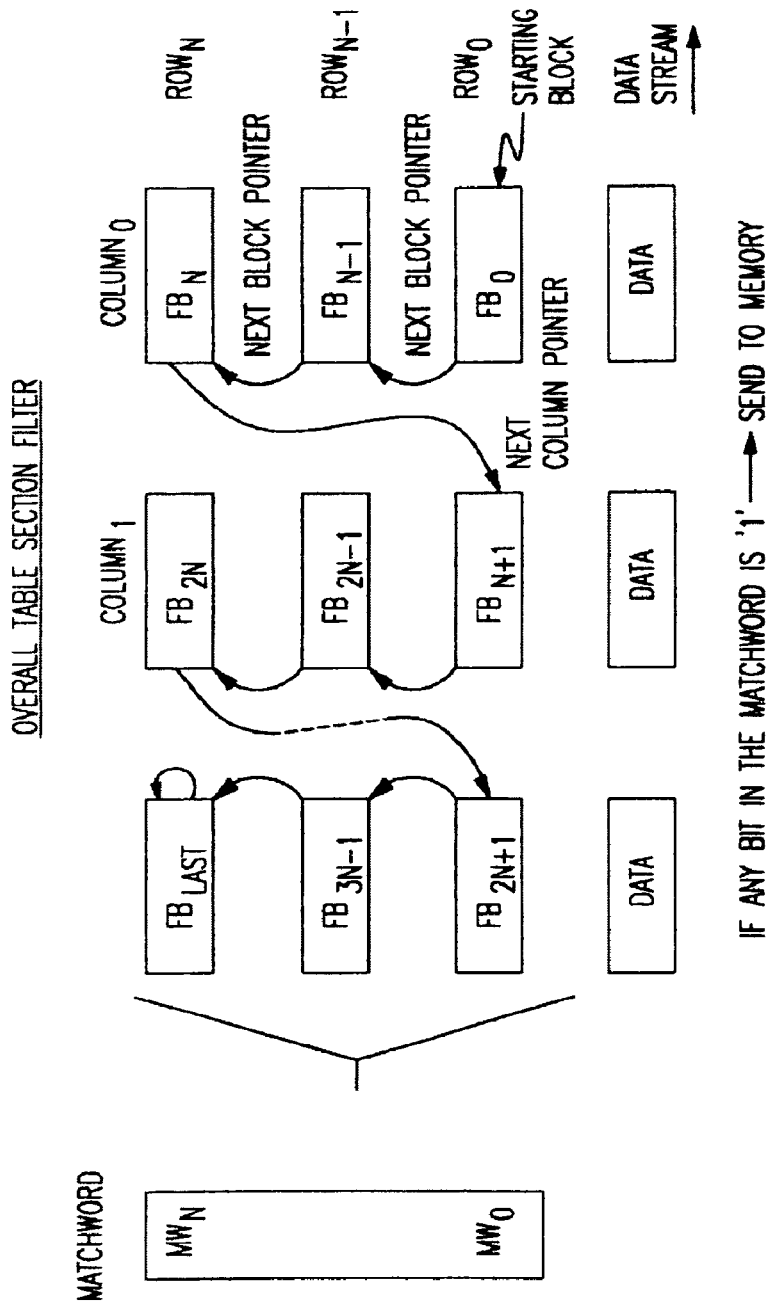
FIG. 4 illustrates control of storage or discarding of data in accordance with the invention.

A filter ID is preferably implemented with a section filter ID and a pointer in the form of a "next filter ID" which correlates the section filter ID with the current block of data being filtered to supply appropriate mask and filter register data (e.g. along a row of FIG. 4). The section filter ID and next filter ID are preferably specified in a control word along with other data such as a next column flag, a match/not match flag (which cannot be used to express mixed filtering) or be correlated with mixed or negative filtering for another block to control arbitrary filtering over long bit strings.

Provision of thirty-two filter blocks is also convenient from the standpoint of consistency of size of block of digital signals. That is, since each filter block provides a single bit of compare result CR, as discussed above in regard to FIG. 1, thirty-two filter blocks will provide a matchword MW0 200 with one bit representing each filter block 100 or an associated filter ID. A filter ID allows the association of a plurality of filter algorithms for a corresponding plurality of respective data blocks. For convenience of explanation, the number N of filter blocks used on a single block of data will be referred to as a (first) column 210 (column 0) in the following discussion of FIG. 4. Similarly the filter blocks across a row correspond to a single filter ID and provide different filter algorithms for filtering of respective corresponding bits of a sequence of data blocks as defined by a linked list (represented by arrows in FIGS. 2–4).

Figure 3:
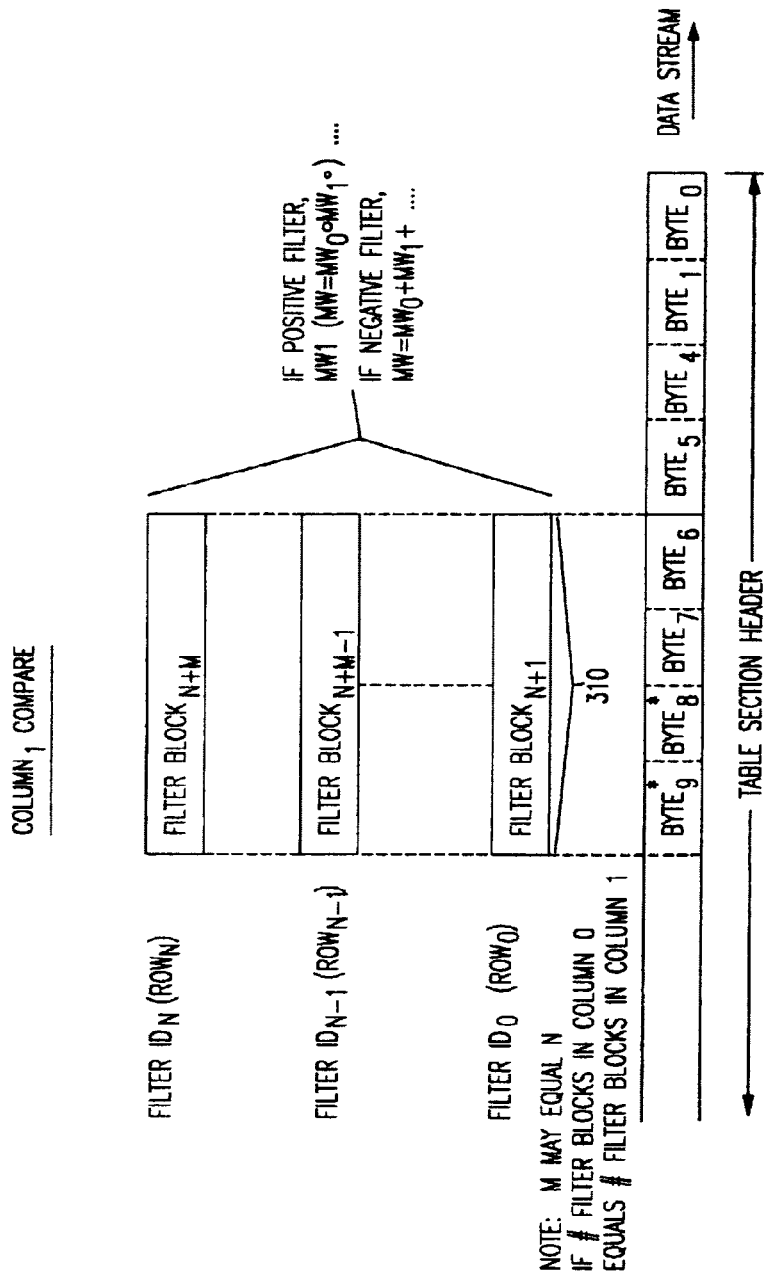
FIG. 3 illustrates performance of a plurality of comparison/filtering functions on a next or subsequent data block of a table section header in accordance with the invention.

FIG. 3 similarly illustrates operation of the filter arrangement of the invention in regard to a next or subsequent block of data. For purposes of this discussion, this next or subsequent data block will be considered to contain byte 6, byte 7 byte 8 and byte 9. Again, the filter blocks are set up into a second column 310 (column 1) of M filter blocks (wherein M can but need not equal N and results in a thirty-two bit matchword MW1 which may immediately be combined with matchword MW0, in a manner depending on whether or not the current filter algorithm includes negative filtering. Specifically, the respective compare result CR bits of each matchword, as developed, is logically combined with the logically combined result of all prior matchwords using AND logic if the current filter block is a positive filter (NM="0") and using OR logic if the current filter block is a negative filter.

Thus a single matchword will be developed at the end of each column and at the end of each variable length word, when all desired filter functions have been performed on all data blocks by all filter columns, as depicted in FIG. 4. Thus each row of FIG. 4 will correspond to a filter ID of arbitrary length. The depiction in FIG. 4 provides three arbitrary filter functions of at least ninety-six bits in length (three columns× data block length). Positive and negative filtering is tracked through the columns (in order to provide positive, negative or mixed filtering on each byte of each data block by the representation of matches under positive filtering and mismatches under negative filtering by the same logic state of the corresponding CR value in the matchword formed over a column and accumulating the final matchword by respectively ANDing or ORing the respective CR values depending on whether the current filter block included positive filtering (e.g. positive or mixed filtering over the data block corresponding to an AND function but exclusively negative filtering over a block corresponding to an OR function for proper accumulating of the matchword although other matchword accumulation may be useful).

Thus, if all data over a variable length of bits passes arbitrary filtering across any row in accordance with the above-described operation of the invention, a logic "1" will appear in the corresponding bit of the accumulated matchword indicating that every bit of every data byte of the bit string of arbitrary length had corresponded to the respective filter algorithms corresponding to the filter ID of that row, regardless of whether the filtering was positive, negative or mixed over each data block at a granularity therein determined by the number of bits provided in the NM register 40 of FIG. 1.

It should be recalled that full flexibility of filter function and variability of length of the datastream upon which filtering is performed is a meritorious effect of the invention. It should also be understood that, in practice, filter functions may be provided in memory (e.g. read only memory) of the STB or through downloading of a filter function from the transmitted data. A modification of a filter function in memory can also be downloaded from transmitted data. For these reasons, in practice, it is desirable to increase flexibility of filter function by providing for an extra SetMW bit 45 in the filter block 100, preferably in not match indicator register 40, as shown in FIG. 1. This bit may be used to directly control use of an AND or OR function as the matchword is accumulated rather than evaluating the contents of the no match indicator register 40 as described above. Therefore, for example, if the length of the filter function were four blocks (sixteen bytes) long and the respective SetMW values for the four words (e.g. A, B, C, D, in the chronology of the filtering process) were "0110" the matchword would be accumulated in accordance with the expression $(((A*B)+C)+D)$.

Since the filter algorithms corresponding to a respective filter IDs are specific to a particular type of data of interest and are fully flexible to express the criteria which reflects the reason for interest (e.g. data having certain common bit values or data containing any change in designated bits) a logic "1" appearing in the final matchword will indicate that the data bit string is, in fact, of interest and the Filter ID can be used to identify the reason for the interest. Therefore, storage in memory can be easily controlled by simply ORing the bits of the final matchword and storing the data bit string and, preferably, the matchword itself, in memory (in a file or at an address indicated by the filter ID, possibly replacing previously stored data) if the result is a logic "1". If the result is a logic "0", the bit sting in the data stream is not of interest and may be safely discarded.

In the interest of completeness, it is noted that, in practice, the filtering as described above is seldom performed for entirely negative filtering since some bits or one or more bytes of data to be stored would be known. Even in such a case, packet filtering would already have been performed and it would be known that storage of completely negative filtered data would be desired. Therefore, the uncertain result of completely negative filtering against random data is not encountered in practice.

Thus, in summary, the digital filtering arrangement in accordance with the invention provides positive, negative or mixed filtering over a bit string in a bit stream of arbitrary length in a hardware efficient manner. A large volume of data can be readily and rapidly screened in this manner such that storage of data which is likely to be later discarded is avoided. Performance of an STB is thus improved since unnecessary signal processing is eliminated and costs of storage hardware are minimized to limit manufacturing costs. The method and apparatus of the invention are particularly advantageous in an MPEG-2 compliant system to which details of the preferred embodiment are particularly directed but can be applied to the screening of any datastream, particularly for negative filtering of long bit strings to detect changed data.

While the invention has been described in terms of a single preferred embodiment, those skilled in the art will recognize that the invention can be practiced with modification within the spirit and scope of the appended claims.

The invention claimed is:

1. A method of filtering a datastream containing transport table sections, said method comprising steps of
    determining presence of transport table sections in a payload portion of a packet of said datastream from a table identification (TID) field in a header of said packet,
    filtering a portion of said transport table sections in accordance with a mask which defines a filter function and a logic state of a not match bit to provide a compare result,
    selecting a next mask and a portion of said transport table sections in accordance with a filter ID, and
    combining compare result values in accordance with a logic values of not match bits in a not match indication register,
    whereby an arbitrary length of said transport table sections are filtered by an arbitrary number of filters having arbitrary filter functions.

2. A method as recited in claim 1, wherein said filter ID is implemented in a control word.

3. A method as recited in claim 2, wherein said Filter ID includes a section filter ID and a next filter ID.

4. A method as recited in claim 1, wherein said combining step includes ANDing or ORing compare result values of a bit or over a group of bits in accordance with logic values of not match bits corresponding to said bit or group of bits.

5. A method as recited in claim 4, wherein said combining step further includes the step of
   accumulating a matchword over a plurality of blocks of filtered data.

6. A method as recited in claim 5, wherein said step of accumulating a matchword is performed by
   ANDing a current matchword bit with a corresponding bit of a previous matchword if the filtering applied to the current block is positive or mixed filtering, and
   ORing a current matchword bit with a corresponding bit of a previous matchword if the filtering applied to the current block is negative filtering
   in accordance with said contents of said not match indication register.

7. A method as recited in claim 5, wherein said step of accumulating a matchword is performed in accordance with logic functions specified by at least one extra bit.

8. A method of filtering a datastream, said method comprising steps of
   filtering a portion of said datastream in accordance with a logic state of a not match bit and a Filter ID to provide a compare result, and
   combining compare result values in accordance with a logic values of not match bits in a not match indication register corresponding to said portion,
   whereby an arbitrary length of said datastream is filtered by an arbitrary filter function.

9. A method as recited in claim 8, wherein said filter ID is implemented in a control word.

10. A method as recited in claim 9, wherein said Filter ID includes a section filter ID and a next filter ID.

11. A method as recited in claim 8, wherein said combining step includes ANDing or ORing compare result values of a bit or over a group of bits in accordance with logic values of not match bits corresponding to said bit or group of bits.

12. A method as recited in claim 11, wherein said combining step further includes the step of
    accumulating a matchword over a plurality of blocks of filtered data.

13. A method as recited in claim 12, wherein said step of accumulating a matchword is performed by
    ANDing a current matchword bit with a corresponding bit of a previous matchword if the filtering applied to the current block is positive or mixed filtering, and
    ORing a current matchword bit with a corresponding bit of a previous matchword if the filtering applied to the current block is negative filtering
    in accordance with said contents of said not match indication register.

14. A method as recited in claim 12, wherein said step of accumulating a matchword is performed in accordance with logic functions specified by at least one extra bit.

* * * * *